United States Patent [19]

Nakata et al.

[11] Patent Number: 5,744,211
[45] Date of Patent: Apr. 28, 1998

[54] MOLDED ARTICLE

[75] Inventors: Rikizou Nakata, Aichi-ken; Hidenori Hayashi, Gifu, both of Japan

[73] Assignee: Toyoda Gosei Co., Ltd., Nishikasugai-Gun, Japan

[21] Appl. No.: 178,626

[22] Filed: Jan. 7, 1994

Related U.S. Application Data

[63] Continuation of Ser. No. 71,039, Jun. 2, 1993, abandoned, which is a continuation of Ser. No. 887,388, May 21, 1992, abandoned, which is a division of Ser. No. 605,100, Oct. 30, 1990, abandoned.

[30] Foreign Application Priority Data

Oct. 31, 1989 [JP] Japan .................. 1-285239

[51] Int. Cl.$^6$ .................................................. B32B 3/04
[52] U.S. Cl. ................ 428/122; 524/525; 524/527; 524/535

[58] Field of Search .................... 524/535, 525, 524/527; 428/122

[56] References Cited

U.S. PATENT DOCUMENTS 3,943,079  3/1976  Hamed ........................ 524/34
4,980,218 12/1990  Nakamura et al. ........... 428/122

FOREIGN PATENT DOCUMENTS 61-238507 10/1986 Japan .

*Primary Examiner*—Peter D. Mulcahy
*Attorney, Agent, or Firm*—Cushman Darby & Cushman IP Group of Pillsbury Madison & Sutro LLP

[57] ABSTRACT

A nitrile rubber-polyvinyl chloride polyblend rubber composition containing a paraffinic process oil alone or a combination of paraffinic process oil and one or more other lubricants, which is used as molded articles such as door mirror bracket. The molded articles of the present invention give a much lower sliding resistance.

11 Claims, 1 Drawing Sheet

MOLDED ARTICLE

This is a continuation of application No. 08/071,039, filed on Jun. 2, 1993, which was abandoned upon the filing hereof; which is a continuation of 07/887,388 filed May 21, 1992, now abandoned; which is a continuation of 07/605,100 filed Oct. 30, 1990, now abandoned.

FIELD OF THE INVENTION

This invention relates to nitrile rubber-polyvinyl chloride polyblend rubber compositions used as a material for rubber molded articles having a glass sliding portion, such as door mirror bracket.

A list of abbreviations used in the present specification is shown below.

NBR—nitrile rubber

PVC—polyvinyl chloride

NBR/PVC—nitrile rubber-polyvinyl chloride polyblend

AN—acrylonitrile

The blending amounts in the present specification are all by weight unless otherwise specified.

RELATED ART STATEMENT

The structure of a door mirror bracket used for mounting a door mirror on a sash door is generally as shown in FIGS. 1 and 2. A mirror-mounting portion 1 has an external shape in which it occupies the included angle portion between the upper edge of the body of a closed door and a front pillar. It also has a glass-accommodating groove 3 whose bottom is on a side on which the bracket is brought into contact with the front pillar. In addition, it has a glass run portion 5 composed of a pair of long lips 4 which are close to each other at the end of the glass-accommodating groove 3, at the open end facing the aforesaid included angle portion. Numeral 6 shows a mounting leg for fixing the bracket on the door body 11. The mirror-mounting portion 1 is composed of a U-shaped insert 7 made of a metal plate and a coating portion 8 made of a high-molecular elastomer material. The glass run portion 5 is formed by extending the coating portion 8. Numeral 9 shows a mirror-mounting hole and numeral 10 a hole for lead wire.

As a material for molding the door mirror bracket, there has been used ethylene-propylene rubber (EPR) which is a conventional material for glass run, etc.

EPR molded products themselves generally have a high coefficient of friction, so that the resistance (friction) to glass sliding (hereinafter referred to "sliding resistance") in the glass run portion 5 of the door mirror bracket is high. Therefore, the glass run portion 5 is conventionally lubricated with a urethane coating or a silicone oil.

However, employment of a urethane coating requires pretreatment (primer treatment, etc.), resulting in increase of the number of production steps. On the other hand, employment of a silicone oil causes adherence of the oil, so that glass is stained. In addition, in both cases, a rubber surface is exposed by coming off of a coating film after the lapse of time, so that the sliding resistance is increased and that glass is stained black by adherence of rubber fine powder formed by abrasion.

Therefore, the same person that applies for a patent on the present invention has proposed the following NBR/PVC rubber composition for molding a door mirror bracket which does not require surface treatment for reducing the sliding resistance in the glass run portion [see Jap. Pat. Appln. Kokai (Laid-Open) No. 60-234046]:

An NBR-based rubber composition obtained by blending 1 to 10 parts of a lubricant with 100 parts of NBR/PVC polyblend having a PVC content of 20 to 60%.

OBJECTS AND SUMMARY OF THE INVENTION

The lubricant described in the above reference, however, cannot bring about a desired sliding-resistance-reducing effect in some cases, depending on a product. When it is blended in a large amount, the sliding resistance can be reduced to a desired value but lubricant bloom (blushing) tends to take place. This tendency is a problem (it is not desirable for decorative design and results in a stain on glass).

In view of such conditions, the present invention is intended to provide an NBR/PVC rubber composition which makes it possible to reduce the sliding resistance greatly without causing lubricant bloom.

The NBR/PVC rubber composition of the present invention solves the problems described above, by the means described below.

The composition is a lubricant-containing NBR/PVC rubber composition used as a material for rubber molded articles having a glass sliding portion, such as glass bracket, which is characterized in that the lubricant is either a paraffinic process oil alone or a combination of said paraffinic process oil and one or more other lubricants.

Figure 1:
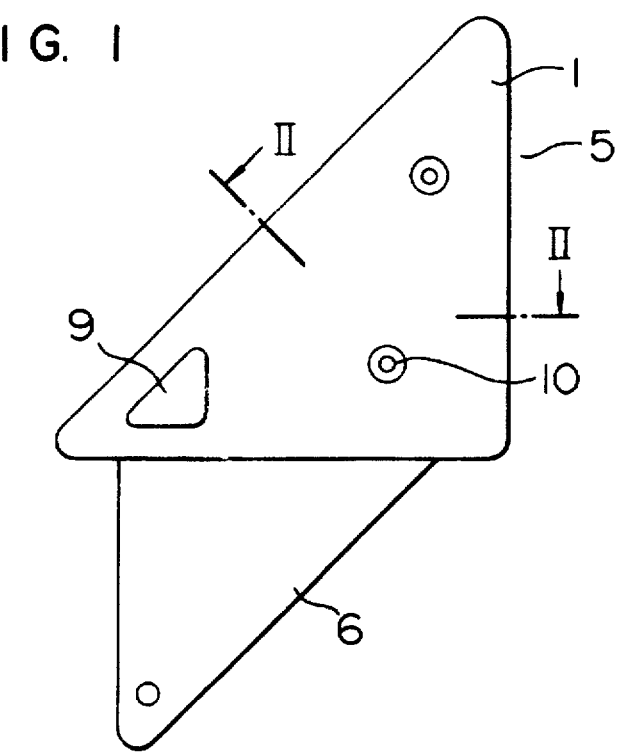
FIG. 1 is a front view showing one example of door mirror bracket to which the present invention is applied.
Figure 2:
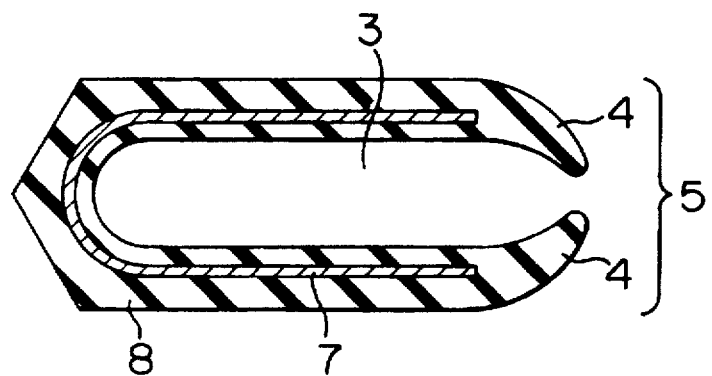
FIG. 2 is an end view along the line 11—11 in FIG. 1.

1—mirror-mounting portion,

3—glass-accommodating groove,

5—glass run portion.

DETAILED DESCRIPTION OF PREFERRED EMBODIMENTS (1) The base polymer of the composition of the present invention is NBR/PVC. The polyblend having a PVC content of 15 to 60% described in the above reference can be used as the base polymer.

When the PVC content is less than 15%, there is not brought about the effects of mixing of PVC (the reduction of the sliding resistance and the improvement of the weather resistance, ozone resistance, oil resistance, chemical resistance and abrasion resistance). On the other hand, when PVC exceeds 60%, the compression set is increased, so that the sealing properties after the lapse of time of the glass run portion are deteriorated.

The NBR is preferably of a moderate-nitrile type (AN content: 25-30%) or a moderate-high-nitrile type (AN content: 31-35%) from the viewpoint of balance in the above-mentioned required physical properties such as polyblending properties, low-temperature resistance, resistance to compression set, etc.

As the PVC, there is preferably used a PVC having a polymerization degree $\bar{P}$ of 1100 to 1400, from the viewpoint of resistance to compression set. But when the polymerization degree is too high, the viscosity of polymer is increased, so that the moldability is liable to be low.

When used, the above polyblend is incorporated with inorganic fillers usually blended with NBR (e.g. carbon black, zinc oxide, etc.), vulcanizing agents, vulcanization accelerators, plasticizers, etc.

(2) The lubricant characteristic of the present invention is either a paraffinic process oil alone or a combination of the paraffinic process oil and one or more other lubricants.

① The kind of the paraffinic process oil is not critical. There can be used either paraffinic process oils having a low viscosity or those having a high viscosity. Usually, there is used a paraffinic process oils having a viscosity of 8 to 105 cPs (100° C.: hereinafter the same applied). When the viscosity of the process oil is too low, the process oil tends to cause lubricant bloom. When it is too high, the sliding-resistance-reducing effect per the unit blending amount of the process oil is lessened, that is, no sufficient effect can be obtained.

Specific examples of the paraffinic process oil are "PW-90" (viscosity: 11.25 cPs) and the like, manufactured by Idemitsu Kosan Co., Ltd., and "P-100" (viscosity: 83.05 cPs), "P-200" (viscosity: 103.8 cPs) and the like, manufactured by Fuji Kosan Co., Ltd.

② As the other lubricants used together with the paraffinic process oil, there can be exemplified the lubricants described in the above reference, such as paraffin waxes, paraffinic synthetic waxes, ester waxes, polyethylene waxes, higher alcohols, silicone oils, silicone resins, and higher fatty acid amides. The silicone oils include "TSF-451 (50 cSt) and (500 cSt)" manufactured by Toshiba Silicone Co., Ltd., etc. The silicone resins include "TOSPAL-240" manufactured by Toshiba Silicone Co., Ltd., etc.

Whether the lubricant is the process oil alone or a combination of the process oil and one or more other lubricants, it is blended usually in an amount of 2 to 10 parts per 100 parts of the polymer component.

When the amount of the lubricant is less than 2 parts, the effect of addition of the lubricant (the sliding-resistance-reducing effect) can hardly be obtained. When it exceeds 10 parts, lubricant bloom tends to take place.

The NBR/PVC rubber composition of the present invention is a lubricant-containing NBR/PVC rubber composition used as a material for molded articles having a glass sliding portion, such as door mirror bracket, which is characterized in that the lubricant is either a paraffinic process oil alone or a combination of said paraffinic process oil and one or more other lubricants. Therefore, it has the action and effect described below.

As described in the examples hereinafter given, molded articles obtained from the rubber composition of the present invention give a much lower sliding resistance, as compared with molded articles obtained from conventional NBR-based rubber compositions, and moreover lubricant bloom hardly takes place in them.

EXAMPLES AND COMPARATIVE EXAMPLES

The test pieces used in Examples and Comparative Examples were obtained from rubber sheets of 2 mmt formed by vulcanization and molding under conditions of 100 kgf/cm²×160° C.×15 min of rubber compositions prepared according to the fundamental recipe shown below by using each lubricant listed in Table 1.

| Fundamental recipe (unit: parts by weight): | |
| --- | --- |
| Polymer (NBR/PVC = 80/20) | 100 |
| Carbon black (MAF) | 60 |
| Plasticizer (fatty acid ester) | 30 |
| Zinc oxide | 5 |
| Stearic acid | 1 |
| Sulfur | 0.5 |
| Vulcanization accelerator | 4 |
| Lubricant | varied |

Test methods of characteristic were as follows.

Figure 3:
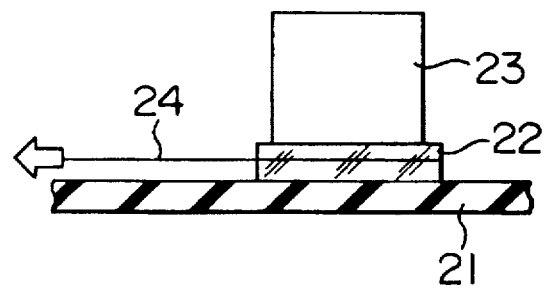
FIG. 3 is a model diagram showing a method for measuring sliding resistance.

(1) Sliding resistance:

As shown in FIG. 3, a glass plate 22 (50 mm×100 mm×5 mmt) and a weight 23 (500 g or 100 g) were placed on a 2 mmt sheet (a test piece) and pulled with a thread 24, and the initial load (static friction) and the average load at glass plate sliding state (dynamic friction) were measured.

(2) Lubricant bloom.

After each test piece had been allowed to stand at room temperature for 480 hours, the existence of surface blook (blushing) was visually judged. The standard of judgement was as follows:

○—No blushing,

△—Slight blushing,

X—Considerable blushing.

From the results shown in Table 1, it can be seen that as compared with molded articles obtained by molding conventional NBR/PVC rubber composition, molded articles obtained by molding the NBR/PVC rubber compositions of the present invention give a lower sliding resistance (a much lower sliding resistance is given particularly when a process oil having a low viscosity is used alone as lubricant) and have a satisfactory appearance (no lubricant bloom).

In detail, in Example 1 in which a process oil having a low viscosity was used, the sliding resistance values are much lower than not only in Comparative Examples 2 and 3 wherein a conventional lubricant paraffin wax was used but also in Comparative Example 6 (the sliding resistance given therein is the lowest of those given in Comparative Examples) wherein a silicone oil was used. In addition, in the case of using a process oil having a high viscosity (which hardly blooms) (Examples 2 and 3), the sliding-resistance-reducing effect is smaller than in Example 1 but larger than in Comparative Example 6. Furthermore, in the case of using a process oil in combination with another lubricant (Examples 4 and 5), said effect is smaller than in the case of using this process oil alone, but larger than in Comparative Example 6.

TABLE 1

|  | Lubricant | Blending amount (parts) | Sliding resistance Static friction (g) | Sliding resistance Dynamic friction (g) | Appearance |
|---|---|---|---|---|---|
| Comparative Example 1 | (No addition) |  | 820 | 600 | ○ |
| Comparative Example 2 | Paraffin wax 130° F. | 5.0 | 220 | 110 | Δ |
| Comparative Example 3 | Paraffin wax 155° F. | 5.0 | 600 | 350 | ○ |
| Comparative Example 4 | Microcrystalline wax (mp 70° C.) | 5.0 | 360 | 280 | ○ |
| Comparative Example 5 | TOSPAL 240 *1) | 5.0 | 750 | 550 | ○ |
| Comparative Example 6 | TSF-451 *2) (500 cSt) | 5.0 | 130 | 100–200 | Δ |
| Example 1 | PW 90 *3) (11.25 cPs) | 5.0 | 50 | 20 | ○ |
| Example 2 | P-200 *4) (83.05 cPs) | 5.0 | 104 | 53 | ○ |
| Example 3 | P-300 *4) (103.8 cPs) | 5.0 | 100 | 82 | ○ |
| Example 4 | PW 90 (11.25 cPs) TSF-451 (500 cSt) | 2.5 2.5 | 60 | 40 | ○ |
| Example 5 | PW 90 (11.25 cPs) TOSPAL 240 | 2.5 2.5 | 130 | 90 | ○ |
| Comparative Example 7 | Paraffin wax 130° F. TSF-451 (500 cSt) | 2.5 2.5 | 480 | 350 | ○ |

*1) silicone resin mfd. by Toshiba Silicone Co., Ltd.
*2) silicone oil mfd. by Toshiba Silicone Co., Ltd.
*3) paraffinic process oil mfd. by Idemitsu Kosan Co., Ltd.
*4) paraffinic process oil mfd. by Fuji Kosan Co., Ltd.

What is claimed is:

1. A molded article comprising:

a glass accommodating groove having a glass run portion which contacts a movable glass surface, the glass run consisting of:

a rubber blend of a nitrile rubber and 15–60% by weight of polyvinyl chloride; and a lubricant consisting of a paraffinic process oil, wherein the paraffinic process oil has a viscosity of 8 to 105 cPs at 100° C., and wherein the paraffinic process oil is present in an amount of 2–10 parts per 100 parts of the rubber blend.

2. A molded article according to claim 1, wherein the polyvinyl choride has a polymerization degree of 1100 to 1400.

3. A molded article according to claim 1, wherein the nitrile rubber contains acrylonitrile in the amount of 25–35% by weight.

4. A molded article comprising:

a glass accommodating groove having a glass run portion which contacts a movable glass surface, the glass run consisting essentially of:

a rubber blend of a nitrile rubber and 15–60% by weight of polyvinyl chloride;

a lubricant consisting essentially of a paraffinic process oil, wherein the paraffinic process oil has a viscosity of 8 to 105 cPs at 100° C., and wherein the paraffinic process oil is present in an amount of 2–10 parts per 100 parts of the rubber blend; and at least one of a paraffin wax, a paraffinic synthetic wax, an ester wax, a polyethylene wax, a higher alcohol, a silicone oil, a silicone resin, and a higher fatty acid amide.

5. A molded article comprising:

a glass accommodating groove having a glass run portion which contacts a movable glass surface, the glass run consisting essentially of:

a rubber blend of a nitrile rubber and 15–60% by weight of polyvinyl chloride;

a lubricant consisting essentially of a paraffinic process oil, wherein the paraffinic process oil has a viscosity of 8 to 105 cPs at 100° C., and wherein the paraffinic process oil is present in an amount of 2–10 parts per 100 parts of the rubber blend; and at least one of a vulcanizing agent, a vulcanization accelerator, a plasticizer and an inorganic filler.

6. A molded article comprising:

a glass accommodating groove having a glass run portion which contacts a movable glass surface, the glass run consisting essentially of:

a rubber blend of a nitrile rubber and 15–60% by weight of polyvinyl chloride;

a lubricant consisting essentially of a paraffinic process oil, wherein the paraffinic process oil has a viscosity of 8 to 105 cPs at 100° C., and wherein the paraffinic process oil is present in an amount of 2–10 parts per 100 parts of the rubber blend;

at least one of a vulcanizing agent, a vulcanization accelerator, a plasticizer and an inorganic filler; and at least one of a paraffin wax, a paraffinic synthetic wax, an ester wax, a polyethylene wax, a higher alcohol, a silicone oil, a silicone resin, and a higher fatty acid amide.

7. A molded article according to any one of claims 1–6, wherein the sliding portion is a door mirror bracket that slides on glass.

8. A method of using a molded article for sliding on glass, wherein the molded article is resistant to blooming at the surface, is resistant to ozone, is resistant to ozone, is resistant to discoloring the glass, has a good external appearance, and wherein the molded article comprises:

a glass accommodating groove having a glass run portion which contacts a movable glass surface, the glass run comprising:

a rubber blend of a nitrile rubber and 15–60% by weight of polyvinyl chloride;

a lubricant comprising a paraffinic process oil, wherein the paraffinic process oil has a viscosity of 8 to 105 cPs at 100° C., and wherein the paraffinic process oil is present in an amount of 2–10 parts per 100 parts of the rubber blend.

9. A molded article free of fiber comprising:

a glass accommodating groove having a glass run portion which contacts a movable glass surface, the glass run comprising:

a rubber blend of a nitrile rubber and 15–60% by weight of polyvinyl chloride; and a lubricant comprising a paraffinic process oil, wherein the paraffinic process oil has a viscosity of 8 to 105, and wherein the paraffinic process oil is present in an amount of 2–10 parts per 100 parts of the rubber blend.

10. An automotive door mirror bracket comprising:

a glass accommodating groove having a glass run which contacts a movable glass surface, the glass run consisting essentially of:

a rubber blend of a nitrile rubber and 15–60% by weight of polyvinyl chloride; and a lubricant comprising a paraffinic process oil, wherein the paraffinic process oil has a viscosity of 8 to 105 cPs at 100° C., and wherein the paraffinic process oil is present in an amount of 2–10 parts per 100 parts of the rubber blend.

11. A glass bracket comprising:

a glass accommodating groove having a glass run which contacts a movable glass surface, the glass run consisting essentially of:

a rubber blend of a nitrile rubber and 15–60% by weight of polyvinyl chloride; and a consisting essentially of a paraffinic process oil, wherein the paraffinic process oil has a viscosity of 8 to 105 cPs at 100° C., and wherein the paraffinic process oil is present in an amount of 2–10 parts per 100 parts of the rubber blend.

\* \* \* \* \*